US011013352B2

(12) United States Patent
Stewart

(10) Patent No.: US 11,013,352 B2
(45) Date of Patent: May 25, 2021

(54) ADJUSTABLE HEIGHT BED SKIRT

(71) Applicant: Standard Textile Co., Inc., Cincinnati, OH (US)

(72) Inventor: Richard Stewart, Mason, OH (US)

(73) Assignee: Standard Textile Co., Inc., Cincinnati, OH (US)

( * ) Notice: Subject to any disclaimer, the term of this patent is extended or adjusted under 35 U.S.C. 154(b) by 393 days.

(21) Appl. No.: 16/147,982

(22) Filed: Oct. 1, 2018

(65) Prior Publication Data
US 2019/0099020 A1 Apr. 4, 2019

Related U.S. Application Data

(60) Provisional application No. 62/567,839, filed on Oct. 4, 2017.

(51) Int. Cl.
| | | |
|---|---|---|
| *A47G 9/04* | (2006.01) | |
| *A47G 9/02* | (2006.01) | |
| *F16B 1/00* | (2006.01) | |
| *A44B 18/00* | (2006.01) | |

(52) U.S. Cl.
CPC ............ *A47G 9/04* (2013.01); *A47G 9/0292* (2013.01); *A44B 18/00* (2013.01); *F16B 1/0071* (2013.01); *F16B 2001/0028* (2013.01)

(58) Field of Classification Search
CPC ...... A47G 9/04; A47G 9/0292; A47G 9/0238; A44B 18/00; F16B 1/0071; F16B 2001/0028
USPC ........................................................... 5/502
See application file for complete search history.

(56) References Cited

U.S. PATENT DOCUMENTS

| | | | |
|---|---|---|---|
| 2,619,658 A | 12/1952 | Weinberg | |
| D339,495 S | 9/1993 | Murray | |
| 5,353,456 A | 10/1994 | Evans | |
| 5,621,931 A * | 4/1997 | Hamilton | A47G 9/0292 |
| | | | 5/493 |
| 5,715,553 A | 2/1998 | Baron et al. | |
| 7,337,480 B2 | 3/2008 | Borino | |
| 7,984,522 B1 * | 7/2011 | Pfleger | A47G 9/0292 |
| | | | 5/493 |
| 8,245,333 B2 * | 8/2012 | Hamilton | A47G 9/0292 |
| | | | 5/493 |
| 2007/0022534 A1 | 2/2007 | Richards | |

(Continued)

*Primary Examiner* — Nicholas F Polito
*Assistant Examiner* — George Sun
(74) *Attorney, Agent, or Firm* — Wood Herron & Evans LLP

(57) ABSTRACT

An adjustable height bed skirt is provided for covering a gap defined between a mattress of a bed and a floor surface upon which the bed sits. The bed skirt includes a decking panel with a plurality of fastening strips spaced-apart from one another and extending along the bottom edge and side edges of the decking panel. A skirt panel includes a fastening strip that can be removably coupled to one of the plurality of fastening strips on the decking panel to adjust a vertical drop height that the skirt panel covers as it extends along three sides of the bed. The skirt panel includes corner pleats and the decking panel includes bottom corner portions, each of which do not include the fastening strips. Additionally, color-coded indicia elements are applied to the fastening strips on the decking panel to assist with connecting the skirt panel in the desired position.

20 Claims, 4 Drawing Sheets

(56) References Cited

U.S. PATENT DOCUMENTS

| | | | |
|---|---|---|---|
| 2009/0205134 A1* | 8/2009 | Wootten, Jr. | A47G 9/04 |
| | | | 5/488 |
| 2009/0313795 A1* | 12/2009 | Hardee | A47G 9/0292 |
| | | | 24/596.1 |
| 2011/0167561 A1* | 7/2011 | Gatzke | A47G 9/0292 |
| | | | 5/493 |
| 2012/0042450 A1* | 2/2012 | Hamilton | A47G 9/0292 |
| | | | 5/493 |
| 2012/0060281 A1* | 3/2012 | Mitchell | A47G 9/0292 |
| | | | 5/493 |
| 2014/0000029 A1* | 1/2014 | Masoncup | D05B 93/00 |
| | | | 5/493 |
| 2014/0101850 A1* | 4/2014 | Cuneo | A47G 9/0246 |
| | | | 5/497 |
| 2014/0157517 A1* | 6/2014 | Cohen | A47G 9/04 |
| | | | 5/498 |
| 2017/0000272 A1* | 1/2017 | Caruso | A47G 9/0292 |
| 2017/0156517 A1* | 6/2017 | Rivera-Huerta | A47G 9/0246 |
| 2018/0008065 A1* | 1/2018 | Mun | D05B 3/12 |

\* cited by examiner

ADJUSTABLE HEIGHT BED SKIRT

TECHNICAL FIELD

The present invention relates generally to bedding materials and accessories and, more specifically, to adjustable bed skirts configured to provide a desirable aesthetic appearance around the bottom edges of a bed while also minimizing the flow of dust-laden air under the bed.

BACKGROUND

Typical beds include a mattress supported above a floor surface by a mattress support. As is widely known, mattresses come in certain sizes, such as twin, full, queen, and king (in the U.S. and Canada, other standard sizes being used in Europe and other jurisdictions), each having a respective width between side edges and a respective length between the head end edge and the foot end edge thereof. The types of mattress support available for beds of these different sizes are varied and provide different types of advantages. However, many mattress supports include a bed frame and a box spring, or some alternative type of platform support for holding the mattress on the bed frame. Except for certain types of solid-side frames as found on platform beds, the bed frame typically includes legs that extend down to the floor surface and create a gap between the frame body and the floor surface. This gap is typically desired to be covered to improve the aesthetic appearance of the bed by hiding the non-decorative structural features below the mattress such as the box spring (when present) and the bed frame. Covering the gap also minimizes the flow of ambient air underneath the bed, which limits dust accumulation under the bed in a space that is typically hard to clean or not cleaned as often as spaces outside the bed.

Therefore, it is desirable to provide a bed skirt or bed ruffle to cover the gap around the bottom periphery of a bed. However, some problems have persisted with conventional bed skirt designs. For example, some conventional bed skirts are merely frictionally inserted between the mattress and the mattress support along the periphery of the bed, but normal movements of persons sleeping in the bed and entering/exiting the bed can cause dislodgment of these bed skirts from their positioning, thereby requiring frequent fixing of position. Some conventional bed skirt designs have attempted to address this concern by adding a horizontally extending decking that extends over the entire surface of the interface between a mattress and a box spring (or other mattress support), the decking being connected to the upper edge of the vertically extending bed skirt structure. However, the addition of an integrated decking increases the cost of production, packaging, handling and shipping compared to prior designs. Likewise, the decking must be precisely tailored to the size of the bed that the bed skirt is to be used with, limiting the applicability of such designs and requiring manufacture of many different sizes to meet customer needs.

Another problem with conventional bed skirt designs is that the height of a bed and the mattress support specifically varies depending on the bed design. For example, several typical bed heights, measured from the bottom of the mattress to the floor surface, are about 12 inches, about 14 inches, and about 16 inches. However, many conventional bed skirt designs are designed with a fixed vertical drop length and therefore cannot be used with beds of varying heights. To this end, one example of such a bed skirt is shown in U.S. Pat. No. 5,715,553 to Baron et al., which shows a removable bed skirt portion 15 connected to a retaining element, but the bed skirt portion 15 defines a fixed length that is only useable with one height of bed. If the bed skirt is too long, the material will bunch up or "puddle" on the floor surface, while if the bed skirt is too short, the aesthetic appearance of the bed and the minimizing of dust-laden air flow under the bed will be negatively impacted because a large, visible gap will remain between the bed skirt and the floor surface. Accordingly, such conventional bed skirt designs continue to suffer from the disadvantage that the bed skirt must be carefully tailored in size to the height of the bed that the bed skirt is to be used with. In some commercial and residential contexts where different bed sizes and heights are managed, this reduces the usefulness of such bed skirt designs and adds to the complexity of managing the bedding materials because the same bedding materials cannot be used except for with beds of an exact matching size and height.

More recent bed skirt designs have included some type of adjustability for the bed skirt height, such as, for example, the crib skirt shown in U.S. Pat. No. 8,245,333 to Hamilton et al. However, the skirt panels of such references are separate pieces that are assembled to the top and bottom surfaces of the panel defining the mattress support, and that arrangement adds significant complexities when assembling the bed skirt on the bed. Likewise, the skirt panels can leave gaps at the corner portions of the bed where the mattress support or bed frame may remain visible, if the skirt panels are not aligned in an overlapping fashion.

It would be desirable, therefore, to provide a new adjustable bed skirt that addresses these and other drawbacks of conventional designs, including the ones identified above.

SUMMARY

In one embodiment, an adjustable height bed skirt for use in covering a gap defined between a mattress of a bed and a floor surface upon which the bed sits is provided in which the bed skirt includes a decking panel configured to be positioned in a horizontal orientation on top of a mattress support of the bed. The decking panel includes a top surface, a top edge, a bottom edge, and side edges extending between the top and bottom edges, with bottom corner portions defined at junctions between the bottom edge and the side edges. The decking panel further includes a plurality of discrete, spaced-apart fastening strips on the top surface extending along each of the bottom edge and side edges but not extending over the bottom corner portions. The bed skirt also includes a skirt panel for extending along three sides of the bed. The skirt panel includes a top edge and has a fastening strip configured to removably engage one of the fastening strips on the bottom edge and side edges of the decking panel. The skirt panel further includes a bottom edge opposite the top edge, and corner pleats that are positioned adjacent the bottom corner portions of the decking panel when the fastening strip of the skirt panel is coupled with one of the fastening strips of the decking panel. The fastening strip of the skirt panel extends along the top edge of the skirt panel except at the corner pleats. The skirt panel is repositionable to different ones of the fastening strips on the decking panel to adjust a vertical drop height that the skirt panel covers between the top of the mattress support and the bottom edge of the skirt panel, thereby adjusting for different heights of the bed.

In another embodiment, an adjustable height bed skirt for use in covering a gap defined between a mattress of a bed and a floor surface upon which the bed sits is provided in which the bed skirt includes a decking panel configured to be positioned in a horizontal orientation on top of a mattress support of the bed. The decking panel includes a top surface, a top edge, a bottom edge, and side edges extending between the top and bottom edges, with bottom corner portions defined at junctions between the bottom edge and the side edges and having a rounded corner contour that reduces a size of the decking panel relative to adjacent portions of the bottom edge and the side edge. The decking panel further includes exactly three sets of discrete, spaced-apart fastening strips on the top surface extending along each of the bottom edge and side edges but not extending over the bottom corner portions. The bed skirt also includes a skirt panel formed as a unitary piece that extends along three sides of the bed. The skirt panel includes a top edge and has a fastening strip configured to removably engage one of the fastening strips on the bottom edge and side edges of the decking panel. The skirt panel further includes a bottom edge opposite the top edge and corner pleats that are positioned adjacent the bottom corner portions of the decking panel when the fastening strip of the skirt panel is coupled with one of the fastening strips of the decking panel. The fastening strip of the skirt panel extends along the top edge of the skirt panel except at the corner pleats. The skirt panel is repositionable to different ones of the fastening strips on the decking panel to adjust a vertical drop height that the skirt panel covers between the top of the mattress support and the bottom edge of the skirt panel, thereby adjusting for different heights of the bed.

In yet another embodiment, a method for assembling an adjustable height bed skirt to cover a gap defined between a mattress of a bed and a floor surface upon which the bed sits is provided. The method includes positioning a decking panel in a horizontal orientation on top of a mattress support of the bed so that a top surface of the decking panel faces away from the mattress support, the decking panel including a top edge, a bottom edge, and side edges extending between the top and bottom edges, with bottom corner portions defined at junctions between the bottom edge and the side edges. The decking panel further includes a plurality of discrete, spaced-apart fastening strips on the top surface and extending along each of the bottom edge and side edges but not extending over the bottom corner portions. A skirt panel is engaged via a fastening strip of the skirt panel to one of the fastening strips on the bottom edge and side edges of the decking panel for extending the skirt panel along three sides of the bed. The skirt panel is repositionable to different ones of the fastening strips on the decking panel to adjust a vertical drop height that the skirt panel covers between the top of the mattress support and a bottom edge of the skirt panel, thereby adjusting for different heights of the bed.

BRIEF DESCRIPTION OF THE DRAWINGS

The accompanying drawings, which are incorporated in and constitute a part of this specification, illustrate embodiments of the invention and, with a detailed description of the embodiments given below, explain the principles of the invention.

DETAILED DESCRIPTION

Figure 1:
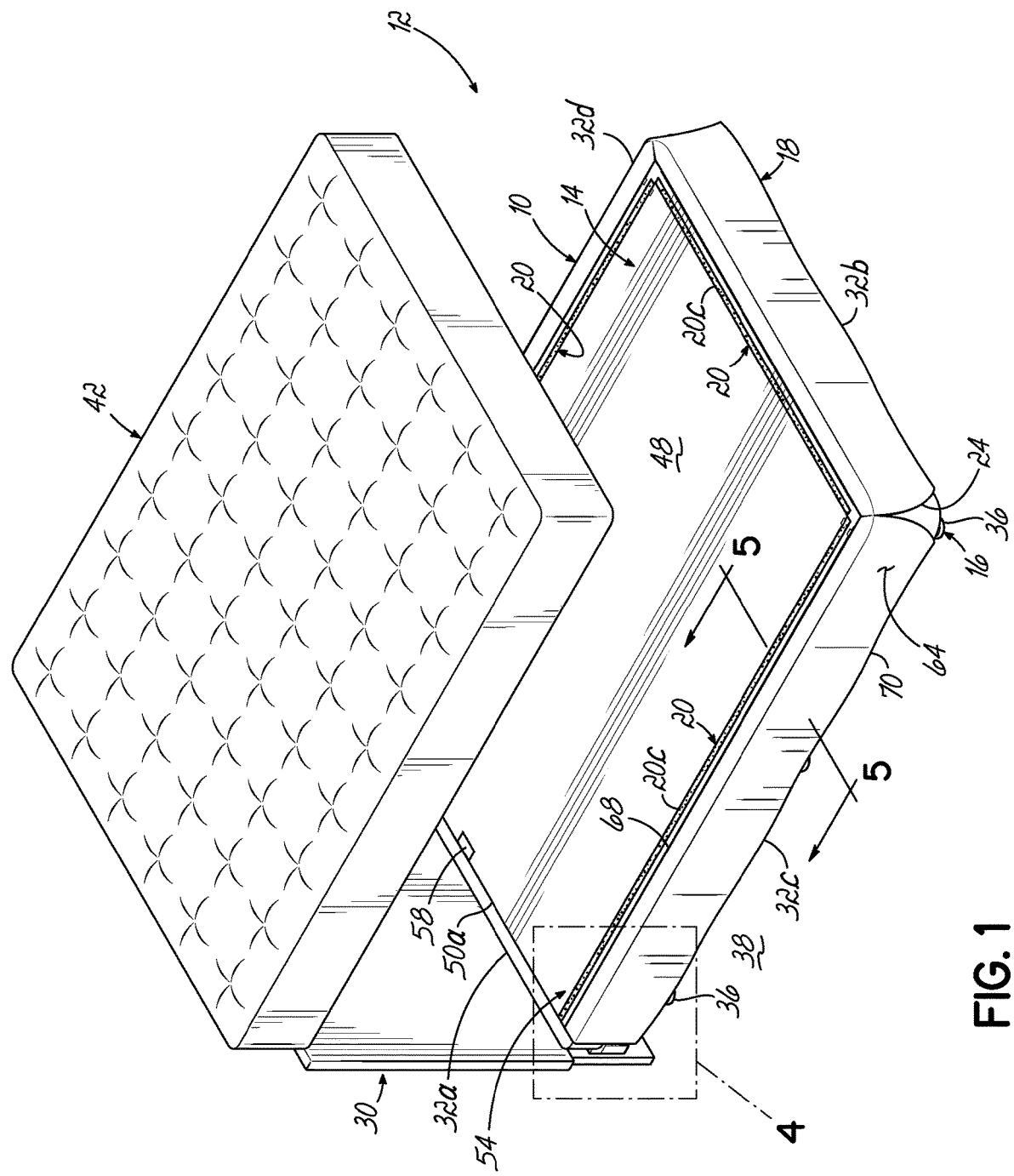
FIG. 1 is a top perspective view of a bed with an adjustable height bed skirt, in accordance with one embodiment of the invention, with a mattress of the bed shown lifted from the mattress support to reveal the components of the bed skirt assembled in position on the mattress support.

FIGS. 1 through 5C show an adjustable height bed skirt 10 and bed 12 in accordance with several embodiments of the invention. The adjustable height bed skirt 10 includes a decking panel 14 that generally sits horizontally on top of a mattress support 16 of the bed 12, and a skirt panel 18 that removably connects to the decking panel 14 in various positions. For example, the decking panel 14 includes a plurality of discrete, spaced-apart fastening strips 20 and the skirt panel 18 includes a corresponding fastening strip 22 that can be removably coupled with the fastening strips 20 on the decking panel 14. Advantageously, the total height of the portion of the skirt panel 18 that extends vertically from a top of the mattress support 16 can be varied for different heights of bed 12 by connecting the skirt panel 18 to different sets of fastening strips 20 on the decking panel 14, thereby enabling the bed skirt 10 to be used with different types of beds. Furthermore, the skirt panel 18 is preferably formed as a unitary piece with corner pleats 24 to provide flexibility for full coverage at bottom corner portions of the bed 12. Thus, the skirt panel 18 and the decking panel 14 are easier to assemble and manufacture than conventional adjustable bed skirt designs, while providing the beneficial adjustable height and usefulness with different styles of beds that is lacking in other known bed skirts. Further details of the adjustable height bed skirt 10 will now be described in conjunction with the description of the Figures below.

Use of several descriptive terms, such as top, bottom, head, foot, side, upwardly, downwardly, horizontal, and/or vertical, for example, as it pertains to/describes the bed skirt 10 and its components, is from the viewpoint of when the bed skirt 10 is positioned for use on the bed 12, unless otherwise noted. Variations from the specific orientation and placement described in connection with the illustrated embodiments are possible while remaining within the scope of the invention.

Figure 3:
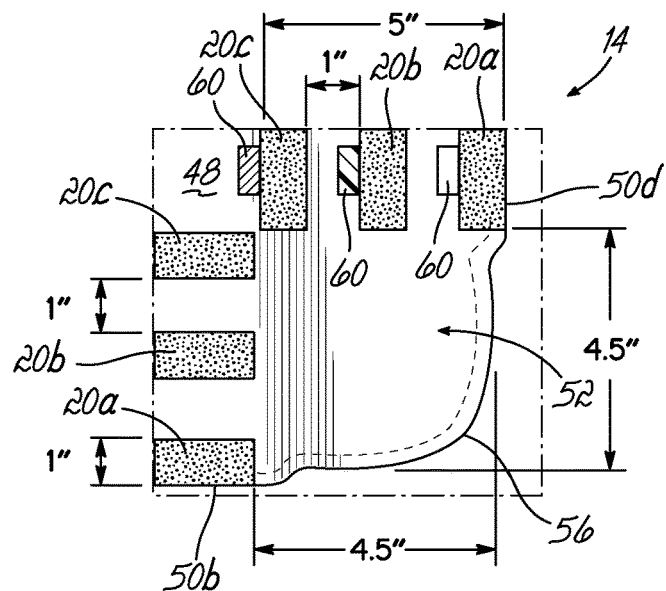
FIG. 3 is a detailed top view of one of the bottom corner portions of the decking panel of FIG. 2, as also identified in detail block "3" of FIG. 2, this view showing some exemplary dimensions at this portion of the decking panel.
Figure 4:
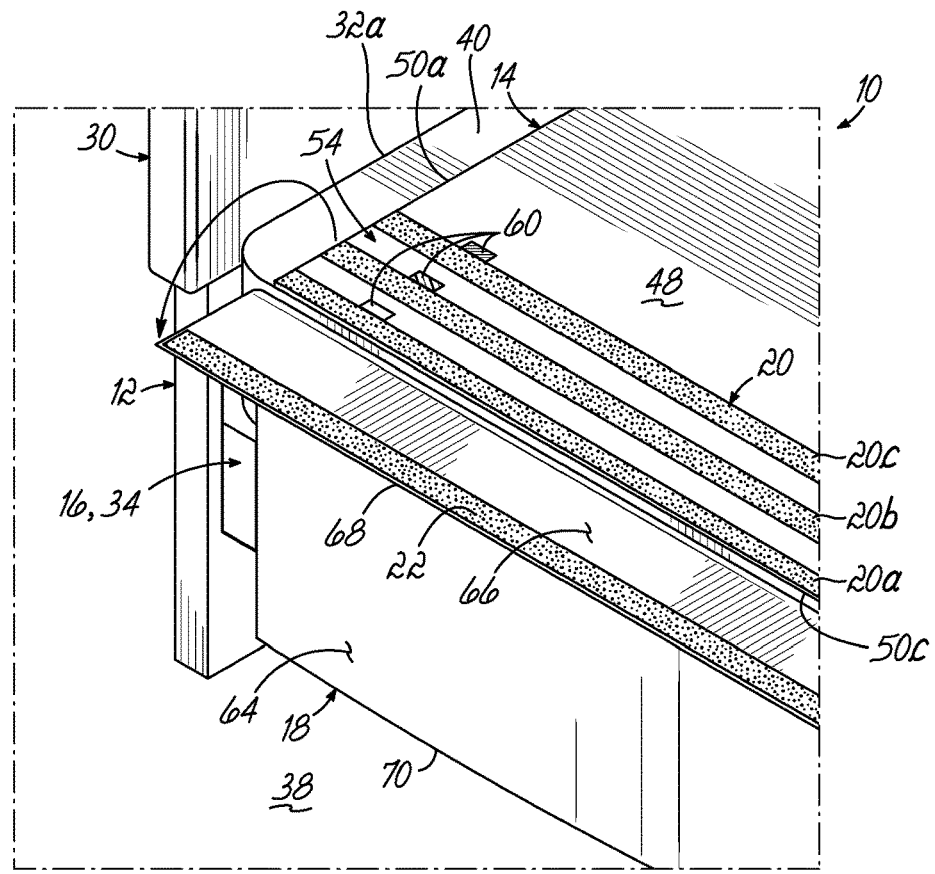
FIG. 4 is a detailed perspective view of one of the top corner portions of the bed skirt of FIG. 1, specifically identified by the detail block "4" in FIG. 1, and this view showing a top end of the skirt panel disconnected from the decking panel and flipped over to reveal a fastening strip along a back side thereof.
Figure 5C:
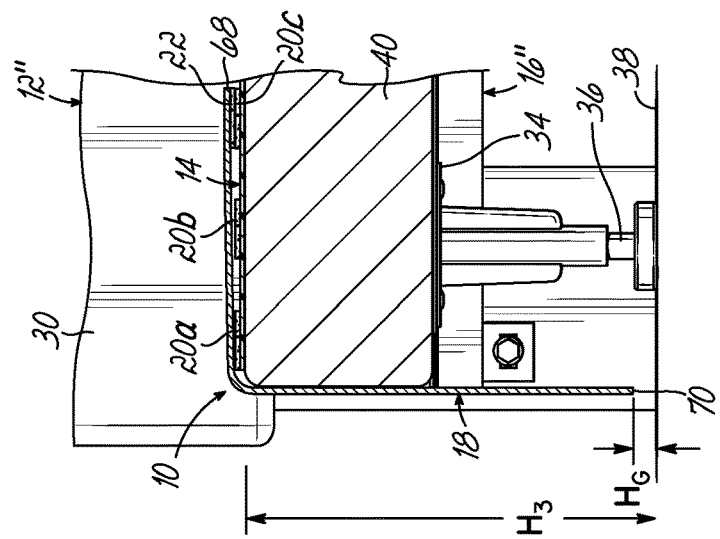
FIG. 5C is a cross-sectional view of another embodiment of the invention, taken through one portion of the bed skirt and bed in a similar manner as FIGS. 5A and 5B, wherein the skirt panel of this embodiment is connected to an innermost of the fastening strips on the decking panel such that the bed skirt covers a mattress support of the bed defining a third height above the floor surface that is smaller than the second height in the bed embodiment of FIG. 5B.
Figure 5B:
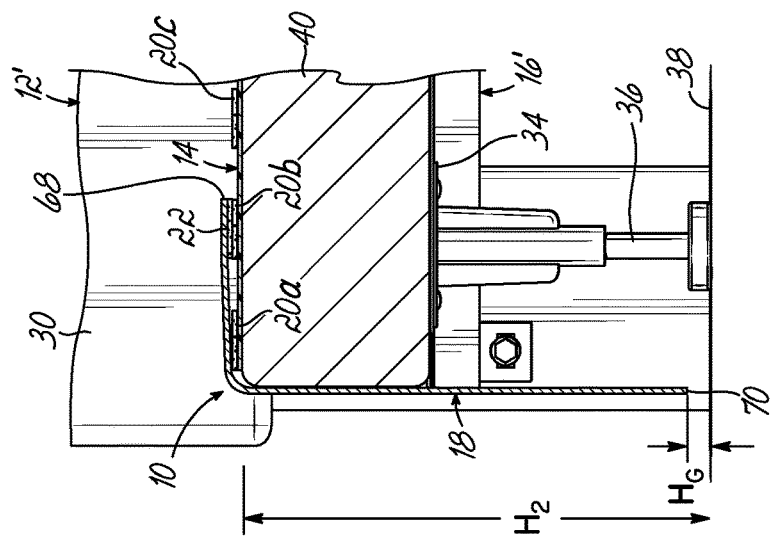
FIG. 5B is a cross-sectional view of another embodiment of the invention, taken through one portion of the bed skirt and bed in a similar manner as FIG. 5A, wherein the skirt panel of this embodiment is connected to a central one of the fastening strips on the decking panel such that the bed skirt covers a mattress support of the bed defining a second height above the floor surface that is smaller than the first height in the bed embodiment of FIG. 5A.
Figure 5A:
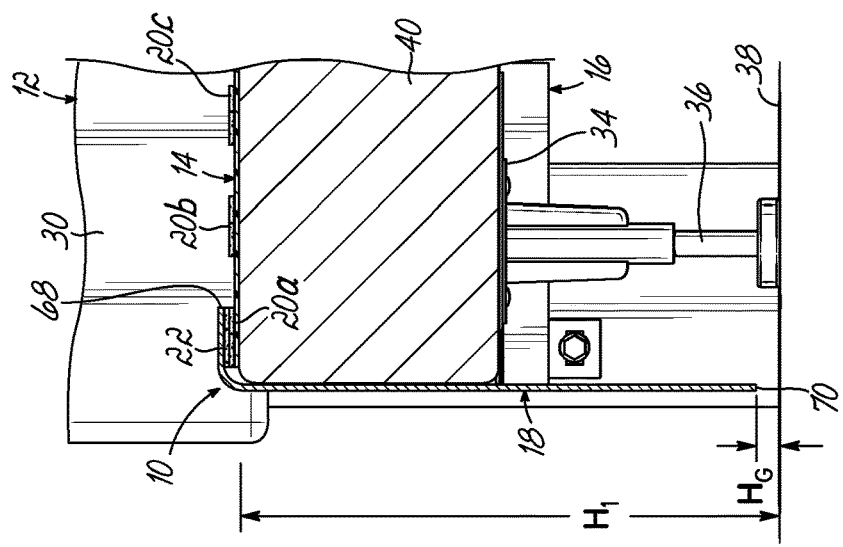
FIG. 5A is a cross-sectional view through one portion of the bed skirt and bed of FIG. 1, taken alone line 5-5 in FIG. 1, wherein the skirt panel is connected to an outermost of the fastening strips on the decking panel such that the bed skirt covers a mattress support of the bed defining a first height above a floor surface.

With specific reference to FIGS. 1 through 5A, one embodiment of the adjustable height bed skirt 10 is shown in further detail. As shown in FIGS. 1 and 5A, the bed 12 of this embodiment includes a headboard 30 located at a head end edge 32a. The mattress support 16 is defined by a bed frame 34 with a plurality of legs 36 extending to the floor surface 38, and a box spring 40 sitting on top of the bed frame 34. Although the bed frame 34 is shown as a conventional metal bed frame in these Figures, it will be understood that other types of mattress support could also be used, including ones without a box spring 40. Regardless of the arrangement of elements defining the mattress support 16, the mattress support 16 defines a height above the floor surface 38. Along the foot end edge 32b and side edges 32c, 32d of the bed 12, it is desirable to cover a gap of approximately this height using the bed skirt 10. A mattress 42 is placed on top of the mattress support 16 to complete the bed 12, the mattress 42 being shown lifted off the remainder of the bed 12 in FIG. 1 to reveal positioning and details of the adjustable height bed skirt 10. The mattress 42 is shown without any sheets or bedding materials in this view, but it will be understood that such coverings would be added to complete the desired aesthetic appearance of the bed 12 in a final assembled state according to this invention.

The bed skirt 10 when assembled is configured to cover a substantial majority of the gap defined by the height measured between the top of mattress support 16 (e.g., bottom of mattress 42) and the floor surface 38. As shown in FIG. 1, this arrangement substantially hides from view the mattress support 16 and the gap between the bed frame 34 and the floor surface 38. To accurately position the bed skirt 10 in this position, the decking panel 14 is provided with features that enable position adjustment of the skirt panel 18, thereby allowing the vertical height of the skirt panel 18 to be modified between several discrete height values as set forth below.

Figure 2:
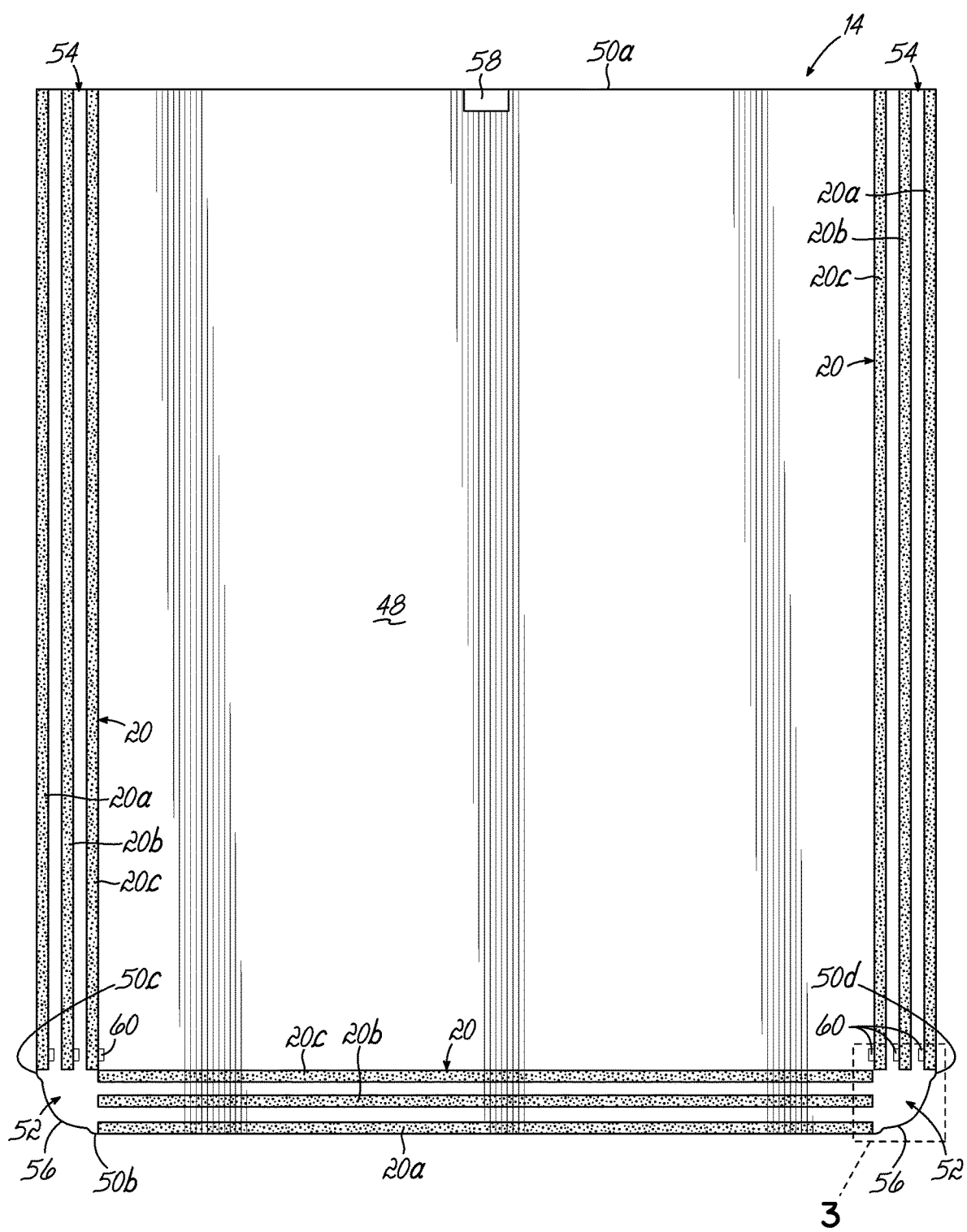
FIG. 2 is a top plan view of a decking panel defining one part of the bed skirt shown in FIG. 1.

In this regard, and with specific reference to FIG. 2, the decking panel 14 of the adjustable height bed skirt 10 is shown in further detail. The decking panel 14 is typically formed from a sheet of fabric material that is sized generally consistent with the size of the bed 12 that the bed skirt 10 is to be placed around, and the decking panel 14 is laid in horizontal orientation on top of the mattress support 16 of the bed 12. For example, the decking panel 14 for a standard King-size bed, which has a box spring 40 or mattress support 16 defining dimensions of about 76 inches by 80 inches, would be approximately 72 inches by 78 inches. An example of width and length dimensions of the decking panel 14 for several standard U.S./Canadian bed sizes and several European standard bed sizes are provided in Table 1, in accordance with one embodiment of the invention.

TABLE 1

Decking Panel Dimensions for Various Bed Sizes (sizes in Inches)

| Box Spring | | Decking Finished Dimensions | |
|---|---|---|---|
| Width | Length | Width | Length |
| 72 | 83¾ | 68 | 81¾ |
| 76 | 80 | 72 | 78 |
| 59¾ | 80 | 55¾ | 78 |
| 54 | 75¼ | 50 | 73¼ |

TABLE 1-continued

Decking Panel Dimensions for Various Bed Sizes (sizes in Inches)

| Box Spring | | Decking Finished Dimensions | |
|---|---|---|---|
| Width | Length | Width | Length |
| 39 | 80 | 35 | 78 |
| 39 | 75¼ | 35 | 73¼ |
| 72 | 78¾ | 68 | 76¾ |
| 60 | 80 | 56 | 78 |
| 54 | 75¼ | 50 | 73¼ |
| 36 | 75¼ | 32 | 73¼ |

The decking panel 14 includes a top surface 48 that faces upwardly towards the mattress 42 and a bottom surface (not shown) that engages the box spring 40 in this embodiment. It will be appreciated that the decking panel 14 may be secured in position using fastening elements (also not shown) of various types connecting the bottom surface to the mattress support 16, or the decking panel 14 may simply be sandwiched in position between the mattress 42 and the mattress support 16. The bottom surface of the decking panel 14 does not include any fastening strips or other features configured to interact with the skirt panel 18 in this embodiment. The decking panel 14 is generally planar and covers a length between a top edge 50a that extends adjacent and along the head end edge 32a of the bed 12, and a bottom edge 50b that extends adjacent and along the foot end edge 32b. Likewise, the decking panel 14 covers a width between side edges 50c, 50d that extend along the side edges 32c, 32d of bed 12. As noted above, the decking panel 14 is specifically sized in width and height to generally correspond to the size of bed 12 with which the bed skirt 10 is to be used.

The decking panel 14 includes three sets of fastening strips 20 as shown in FIG. 2, these fastening strips 20 being located along the bottom edge 50b as well as the side edges 50c, 50d. More specifically, the decking panel 14 of this embodiment includes an outermost fastening strip 20a extending on the top surface 48 along the periphery of each of the bottom edge 50b and the side edges 50c, 50d. The outermost fastening strip 20a is a separate and discrete element for each of the edges as shown by the gap provided at the bottom corner portions 52 shown in FIGS. 2 and 3, the bottom corner portions 52 defined at junctions between the bottom edge 50b and the side edges 50c, 50d. Similarly, each of the edges 50b, 50c, 50d includes a separate and discrete central fastening strip 20b that runs parallel to the corresponding outermost fastening strip 20a. The central fastening strips 20b are spaced from the outermost fastening strips 20a by about 1 inch, in this embodiment. Each of the edges 50b, 50c, 50d further includes a separate and discrete innermost fastening strip 20c that runs parallel to the central fastening strip 20b. The innermost fastening strips 20c are spaced from the central fastening strips 20b by about 1 inch, in this embodiment. Each of the fastening strips 20a, 20b, 20c is about 1 inch in width as well in this embodiment, making the spacing between adjacent strips approximately equal to the width of the strips in those locations. However, it will be understood that the size/width of the fastening strips 20a, 20b, 20c and the spacing between them can vary in other embodiments consistent with the scope of the invention. The fastening strips 20a, 20b, 20c are formed of a coupling material such as hook and loop closures (e.g., VELCRO®) that are adhered, sewn or otherwise secured to the fabric sheet material of the decking panel 14 in the present embodiment, but other closures or fastening elements may also be used in other embodiments.

Although there are exactly three discrete fastening strips 20a, 20b, 20c on the decking panel 14 in the illustrated embodiment, it will be understood that a different number of discrete and separated strips may be used in other embodiments, depending on the total range of vertical drop height options are desired by an end user of the bed skirt 10. By providing a limited and discrete number of fastening strips, however, this invention advantageously makes it easy to align and assemble the skirt panel 18 to the decking panel 14 to achieve the desired result of having sufficient skirt material to cover most of the gap left around the edges of the mattress support 16 of bed 12. In this regard, the bed skirt 10 provides height adjustment benefits without necessitating complicated or difficult assembly of components, which can be the case in some of the prior art references described in the Background section above.

As shown in FIG. 2, the fastening strips 20a, 20b, 20c extend all the way to the top edge 50a of the decking panel 14 at the top corner portions 54, which are defined at the opposite end from the bottom corner portions 52. It will be understood that the fastening strips 20a, 20b, 20c (as well as the fastening strip 22 on the skirt panel 18) may be continuous or discontinuous along the length of the bottom edge 50b and the side edges 50c, 50d. The top corner portions 54 of the decking panel 14 are therefore generally square corners of the fabric sheet material defining the decking panel 14. Also along the top edge 50a, the decking panel 14 includes a label 58 that may serve as an identification tag containing information on the manufacturer and the size of the bed skirt 10. The label 58 is shown in the middle of the top edge 50a, but it will be understood that alternative placement of the label 58 is possible in other embodiments of the invention. By contrast from the top corner portions 54, the bottom corner portions 52 of the decking panel 14 are rounded and do not contain the fastening strips 20a, 20b, 20c. These bottom corner portions 52 are now described in further detail with reference to FIG. 3.

FIG. 3 shows one of the bottom corner portions 52 of the decking panel 14 in further detail, including exemplary dimensions of the components of this embodiment. To this end, the fabric sheet of material is trimmed to define a rounded corner contour 56 that has a narrower overall width of about 4.5 inches as shown in the Figure, as compared to the approximate 5-inch width of the portions of the bottom edge 50b and side edge 50d extending from the bottom corner portion 52. In other words, the rounded corner contour 56 at the bottom corner portion 52 is a reduced size portion of the decking panel 14 relative to the adjacent bottom edge 50b and side edge 50d. Each of the fastening strips 20a, 20b, 20c extending along the bottom edge 50b and the side edge 50d terminates before the bottom corner portion 52. This allows the corner pleats 24 of the skirt panel 18 to wrap around and over this bottom corner portion 52 without necessitating specific placement or connection to the decking panel 14 at this location. The assembly of the skirt panel 18 with the decking panel 14 is therefore made easier for a user with more flexibility for the design, as well as better aesthetics at these locations.

Also shown in FIG. 3, the fastening strips 20a, 20b, 20c further include a height adjustment indicia element 60 associated with and/or connected to each of the fastening strips 20a, 20b, 20c near one or more of the bottom corner portions 52 and/or the top corner portions 54. In the illustrated embodiment, the height adjustment indicia element 60 is provided by ⅝-inch wide color-coded pieces of twill tape that are stitched in position to project outwardly from underneath the corresponding fastening strips 20a, 20b, 20c. In one example, the indicia element 60 connected to the outermost fastening strip 20a may be white in color, the indicia element 60 connected to the central fastening strip 20b may be blue in color, while the indicia element 60 connected to the innermost fastening strip 20c may be green in color. Other colors may be used, and it will be understood that the indicia elements 60 may be at any one or a plurality of the corner portions in different embodiments consistent with the scope of this invention. The color-coding will help a user identify which of the fastening strips 20a, 20b, 20c that the skirt panel 18 should be connected to achieve the desired vertical drop height of the skirt panel 18 around the edges of the bed 12. For example, connection to the outermost fastening strips 20a may result in a skirt height or coverage of about 16 inches, while connection to the central fastening strips 20b may result in a skirt height of about 14 inches, and connection to the innermost fastening strips 20c may result in a skirt height of about 12 inches. These height values are exemplary for typical beds 12, and the specific range of heights covered can be modified in other embodiments for different styles of beds, if needed by the end user. It will be appreciated that alternative types of indicia elements 60 are also possible in other embodiments, including but not limited to, sewing the fastening strips 20a, 20b, 20c onto the decking panel 14 with differently-colored thread.

As noted above, the decking panel 14 is formed from a sheet of fabric material. To this end, the decking panel 14 can be constructed of various fabrics such as conventional materials that are typically used in the construction of sheets and similar bedding materials. Fabric construction can be woven, non-woven, or knitted. In one example, the fabric construction is a woven plain weave. The fabric can include natural and/or synthetic fibers and may be lint free, as desired. In one example, the fabric includes polyester, polypropylene, and/or cotton. In another example, the fabric is substantially polyester, substantially cotton, or a polyester/cotton blend (e.g., a 50/50 or other specialized mixtures or weaves as commercially available from Standard Textile Co., Inc., the original assignee of this application). The fabric also may incorporate additional elements such as, but not limited to: ESD (electrostatic dissipative)/anti-static yarns, including nylon or carbon fibers, and the like; liquid resistant material; and/or an antimicrobial finish. These are but some examples of the materials that can be used to form the decking panel 14. The decking panel 14 may include an overcast stitch all around the periphery and edges 50a, 50b, 50c, 50d, and a ¼-inch double turn hem may be provided at the bottom corner portions 52.

The skirt panel 18 that is to be connected to the decking panel 14 is also typically formed from a sheet of fabric material. It will be understood that the fabric material of the decking panel 14 and the skirt panel 18 may be provided in the same material in some embodiments, but the fabric of the decking panel 14 may also be provided in a different material that may be more inexpensive, for example, in other embodiments consistent with the scope of this disclosure. This is because the decking panel 14 in use is hidden from external view when the bed 12 is assembled with the bed skirt 10, while the skirt panel 18 is visible and provides an aesthetic appearance effect. In any event, the materials chosen for the bed skirt 10 and its components can be tailored to meet the needs of various end users in various residential or technical settings.

Further details of the skirt panel 18 are shown in FIGS. 1 and 4. To this end, the skirt panel 18 includes an outer surface 64 that is configured to face outwardly from the periphery of the bed 12 when the bed skirt 10 is installed, and an inner surface 66 that faces towards the mattress support 16. The skirt panel 18 is made from a unitary piece of fabric material and is therefore sized to match the overall width of the three peripheral edges of the mattress support 16 that are to be covered by the bed skirt 10. Moreover, as noted above, the skirt panel 18 advantageously includes corner pleats 24 that allow for some flexibility in placement when extending around the corners of the bed 12. The corner pleats 24 of the illustrated embodiment may be approximately 10 inches in width and formed by folding a 20-inch segment of the fabric material over itself, with a sew line that extends along about 5 inches from a top edge 68 of the skirt panel 18. The specific size and sew of the corner pleats 24 may be modified in other embodiments.

Using that configuration of the corner pleats 24, an example of width and length dimensions of the skirt panel 18 for several standard U.S./Canadian bed sizes and several European standard bed sizes are provided in Table 2, in accordance with one embodiment of the invention (the width dimension of the skirt is calculated based on the length of the side edges and foot end edge, with a small subtraction made to account for the rounded corners).

TABLE 2

Skirt Panel Dimensions for Various Bed Sizes (sizes in Inches)

| Box Spring | | Skirt Finished Dimensions | |
|---|---|---|---|
| Width | Length | Width | Length |
| 72 | 83¾ | 235¾ | 19 |
| 76 | 80 | 231¾ | 19 |
| 59¾ | 80 | 215¾ | 19 |
| 54 | 75¼ | 200¼ | 19 |
| 39 | 80 | 194¾ | 19 |
| 39 | 75¼ | 185¼ | 19 |
| 72 | 78¾ | 225½ | 19 |
| 60 | 80 | 216 | 19 |
| 54 | 75¼ | 200½ | 19 |
| 36 | 75¼ | 182½ | 19 |

The "width" in Table 2 refers to the elongated dimension of the skirt panel 18 that extends along and covers the mattress support 16 at the foot end edge 32b and the side edges 32c, 32d of the bed 12. The "length" is measured between the top edge 68 and a bottom edge 70 of the skirt panel 18, with the bottom edge 70 configured for placement near the floor surface 38 when the bed skirt 10 is fully installed. The skirt panel 18 of the illustrated embodiment includes a 1-inch folded over hem at the bottom edge 70, for example.

At the top edge 68, in the portions apart from the corner pleats 24, the skirt panel 18 includes the fastening strip 22 on the inner surface 66, as shown in FIG. 4. This fastening strip 22 may be adhered, sewn or otherwise secured to the skirt panel 18 and is formed from a coupling material such as hook and loop closures (e.g., VELCRO®), or some similar alternative to match the fastening strips 20 on the decking panel 14. The fastening strip 22 is approximately 1 inch in width so that it matches any of the fastening strips 20a, 20b, 20c that it may be connected to on the decking panel 14. The fastening strip 22 can also have different width in other embodiments, especially if the width of the fastening strips 20a, 20b, 20c is modified from 1 inch. Just like on the decking panel 14, the skirt panel 18 does not include the fastening strip along the bottom corner portions, defined by the corner pleats 24 in the illustrated embodiment. As described in further detail below, the connection of the fastening strip 22 on the skirt panel 18 to one set of the fastening strips 20a, 20b, 20c on the decking panel 14 positions the skirt panel 18 such that it covers a predetermined vertical drop or height associated with the chosen set of fastening strips 20a, 20b, 20c. Therefore, the specific coverage of the bed skirt 10 is adjustable depending on the height of the mattress support 16 and bed 12, increasing the adaptability of the bed skirt 10 for different operating conditions.

FIGS. 5A through 5C illustrate different embodiments of how the bed skirt 10 of the present invention may be installed on different sizes/heights of bed 12, to adjust for different heights. To this end, the mattress support 16, defined in these views by a bed frame 34 and a box spring 40, may define varying heights for where the mattress 42 will be supported relative to the floor surface 38. If a conventional fixed-width bed skirt were purchased for one of these beds 12, the bed skirt would not work with the other two in a desirable manner because either the bottom of the bed skirt would bunch up and pile on the floor surface 38, or alternatively, a larger gap would be left at the bottom edge 70 that allows for too much dust-laden air flow and/or too much visibility of frame elements underneath the bed 12. The adjustable height bed skirt 10 of this disclosure addresses these concerns as shown in the different configurations of FIGS. 5A through 5C.

Starting with FIG. 5A, the mattress support 16 of this bed 12 defines a first height $H_1$ measured over the floor surface 38. This first height $H_1$ may be 16 inches, for example. To sufficiently cover this gap, the skirt panel 18 is connected to the decking panel 14 by engaging the fastening strips 22 on the skirt panel 18 with the outermost fastening strips 20a of the decking panel 14. A user can be directed based on the measured first height $H_1$ to look for the corresponding color-coded indicia elements 60 on the outermost fastening strips 20a, and this helps make it easy to confirm that the skirt panel 18 is being connected at the correct location on the decking panel 14. As FIG. 5A illustrates, the vertical drop height of the skirt panel 18 is almost the same as the first height $H_1$, leaving only a minimal and desirable gap between the bottom edge 70 and the floor surface 38 of gap height $H_G$. The mattress 42 can then be positioned on top of the mattress support 16 and decking panel 14 to complete assembly of the bed 12 with the bed skirt 10 in a correct position.

Turning to the similar but distinct embodiment of FIG. 5B, the mattress support 16' of this bed 12' defines a second height $H_2$ measured over the floor surface 38. This second height $H_2$ may be 14 inches, for example, which may be a result of shorter legs on the frame or a thinner box spring. To sufficiently cover this gap, the skirt panel 18 is connected to the decking panel 14 by engaging the fastening strips 22 on the skirt panel 18 with the central fastening strips 20b of the decking panel 14. A user can be directed based on the measured second height $H_2$ to look for the corresponding color-coded indicia elements 60 on the central fastening strips 20b, and this helps make it easy to confirm that the skirt panel 18 is being connected at the correct location on the decking panel 14. As FIG. 5B illustrates, the vertical drop height of the skirt panel 18 becomes almost the same as the second height $H_2$, leaving only a minimal and desirable gap between the bottom edge 70 and the floor surface 38 of gap height $H_G$. The mattress 42 can then be positioned on top of the mattress support 16' and decking panel 14 to complete assembly of the bed 12' with the bed skirt 10 in a correct position.

Turning to the similar but distinct embodiment of FIG. 5C, the mattress support 16" of this bed 12" defines a third height $H_3$ measured over the floor surface 38. This third height $H_3$ may be 12 inches, for example, which may be a result of shorter legs on the frame or a thinner box spring. To sufficiently cover this gap, the skirt panel 18 is connected to the decking panel 14 by engaging the fastening strips 22 on the skirt panel 18 with the innermost fastening strips 20c of the decking panel 14. A user can be directed based on the measured third height $H_3$ to look for the corresponding color-coded indicia elements 60 on the innermost fastening strips 20c, and this helps make it easy to confirm that the skirt panel 18 is being connected at the correct location on the decking panel 14. As FIG. 5C illustrates, the vertical drop height of the skirt panel 18 becomes almost the same as the third height $H_3$, leaving only a minimal and desirable gap between the bottom edge 70 and the floor surface 38 of gap height $H_G$. The mattress 42 can then be positioned on top of the mattress support 16" and decking panel 14 to complete assembly of the bed 12" with the bed skirt 10 in a correct position.

Consequently, the adjustable height bed skirt 10 of this invention can cover a discrete number of typical drop heights around the periphery of a mattress support 16 on a bed 12, the number being equivalent to the number of sets of fastening strips 20 provided on the decking panel 14. The bed skirt 10 therefore provides a range of adjustability and adaptability that is desirable in contexts where different sized beds (with different sized supports) may be used. Furthermore, the manufacturing and assembly together of the skirt panel 18 and the decking panel 14 are made simple and easy by the provision of a single, unitary skirt panel 18 and a set number of discrete connection points on the decking panel 14 (along with color-coded indicia elements 60). The user therefore does not need to manage a high number of parts or follow complex assembly instructions as is the case conventional adjustable bed skirt designs. Moreover, the construction of the skirt panel 18 with the corner pleats 24 enables improved flexibility for different bed contexts while also assuring desirable aesthetics of the bed skirt 10 along the corners of the bed 12. Thus, the adjustable height bed skirt 10 improves upon bed skirt designs and serves as a simple-to-use, all in one solution for consumers who manage beds of different sizes.

While the present invention has been illustrated by a description of various embodiments and while these embodiments have been described in considerable detail, it is not the intention of the applicant to restrict or in any way limit the scope of the appended claims to such detail. For example, instead of the decking panel 14 including a plurality of fastening elements 20, the bed skirt 10 could be provided with a plurality of fastening elements, such as three discrete, spaced apart fastening elements, like fastening elements 20a, 20b, 20c (along with color-coded indicia elements 60), and the decking panel 14 could be provided with a single fastening element. Additional advantages and modifications will readily appear to those skilled in the art. Thus, the invention in its broader aspects is therefore not limited to the specific details, representative apparatus and method and illustrative example shown and described. Accordingly, departures may be made from such details without departing from the spirit or scope of applicant's general inventive concept.

What is claimed is:

1. An adjustable height bed skirt for use in covering a gap defined between a mattress of a bed and a floor surface upon which the bed sits, the bed skirt comprising:
    a discrete decking panel configured to be positioned in a horizontal orientation between the mattress and a mattress support of the bed, the decking panel including a top surface that faces towards the mattress, a top edge, a bottom edge, and side edges extending between the top and bottom edges, with bottom corner portions defined at junctions between the bottom edge and the side edges, wherein the decking panel further includes a plurality of discrete, spaced-apart fastening strips on the top surface extending along each of the bottom edge and side edges but not extending over the bottom corner portions; and
    a skirt panel for extending along three sides of the bed, the skirt panel including a top edge and having a fastening strip configured to removably engage one of the fastening strips on the bottom edge and side edges of the decking panel, the skirt panel further including a bottom edge opposite the top edge, and corner pleats that are positioned adjacent the bottom corner portions of the decking panel when the fastening strip of the skirt panel is coupled with one of the fastening strips of the decking panel, the fastening strip of the skirt panel extending along the top edge of the skirt panel except at the corner pleats,
    the skirt panel being repositionable to different ones of the fastening strips on the decking panel to adjust a vertical drop height that the skirt panel covers between the top of the mattress support and the bottom edge of the skirt panel, thereby adjusting for different heights of the bed.

2. The bed skirt of claim 1, wherein the plurality of fastening strips on the decking panel includes exactly three sets of fastening strips spaced apart from one another and extending along each of the bottom edge and side edges but not extending over the bottom corner portions.

3. The bed skirt of claim 2, wherein the three sets of fastening strips include an outermost fastening strip, a central fastening strip, and an innermost fastening strip extending along each of the bottom edge and side edges but not extending over the bottom corner portions, and
    wherein the skirt panel is configured to define a vertical drop height of about 16 inches when connected to the outermost fastening strip, a vertical drop height of about 14 inches when connected to the central fastening strip, and a vertical drop height of about 12 inches when connected to the innermost fastening strip.

4. The bed skirt of claim 1, wherein the bottom corner portions of the decking panel define a rounded corner contour that reduces a size of the decking panel relative to adjacent portions of the bottom edge and the side edge.

5. The bed skirt of claim 1, wherein the decking panel further comprises:
    height adjustment indicia elements associated with and/or connected to each of the plurality of fastening strips, the indicia elements being color-coded to identify which of the plurality of fastening strips the skirt panel should be connected to provide the vertical drop height of a certain desired size.

6. The bed skirt of claim 5, wherein the indicia elements are defined by colored pieces of twill tape sewn into position adjacent corresponding ones of the plurality of fastening strips at one or more corner portions of the decking panel.

7. The bed skirt of claim 1, wherein the skirt panel is formed as a unitary piece that extends along three sides of the bed.

8. The bed skirt of claim 1, wherein one or more of the plurality of fastening strips on the decking panel is discontinuous along the bottom edge and/or the side edges or the fastening strip of the skirt panel is discontinuous along the top edge of the skirt panel.

9. The bed skirt of claim 1, wherein the plurality of fastening strips on the decking panel and the fastening strip of the skirt panel define cooperating hook and loop fasteners.

10. An adjustable height bed skirt for use in covering a gap defined between a mattress of a bed and a floor surface upon which the bed sits, the bed skirt comprising:

a discrete decking panel configured to be positioned in a horizontal orientation between the mattress and a mattress support of the bed, the decking panel including a top surface that faces towards the mattress, a top edge, a bottom edge, and side edges extending between the top and bottom edges, with bottom corner portions defined at junctions between the bottom edge and the side edges and having a rounded corner contour that reduces a size of the decking panel relative to adjacent portions of the bottom edge and the side edge, wherein the decking panel further includes exactly three sets of discrete, spaced-apart fastening strips on the top surface extending along each of the bottom edge and side edges but not extending over the bottom corner portions; and a skirt panel formed as a unitary piece that extends along three sides of the bed, the skirt panel including a top edge and having a fastening strip configured to removably engage one of the fastening strips on the bottom edge and side edges of the decking panel, the skirt panel further including a bottom edge opposite the top edge, and corner pleats that are positioned adjacent the bottom corner portions of the decking panel when the fastening strip of the skirt panel is coupled with one of the fastening strips of the decking panel, the fastening strip of the skirt panel extending along the top edge of the skirt panel except at the corner pleats, the skirt panel being repositionable to different ones of the fastening strips on the decking panel to adjust a vertical drop height that the skirt panel covers between the top of the mattress support and the bottom edge of the skirt panel, thereby adjusting for different heights of the bed.

11. The bed skirt of claim 10, wherein the three sets of fastening strips include an outermost fastening strip, a central fastening strip, and an innermost fastening strip extending along each of the bottom edge and side edges but not extending over the bottom corner portions, and wherein the skirt panel is configured to define a vertical drop height of about 16 inches when connected to the outermost fastening strip, a vertical drop height of about 14 inches when connected to the central fastening strip, and a vertical drop height of about 12 inches when connected to the innermost fastening strip.

12. The bed skirt of claim 10, wherein the decking panel further comprises:

height adjustment indicia elements associated with and/or connected to each of the fastening strips, the indicia elements being color-coded to identify which of the fastening strips the skirt panel should be connected to provide the vertical drop height of a certain desired size.

13. The bed skirt of claim 12, wherein the indicia elements are defined by colored pieces of twill tape sewn into position adjacent corresponding ones of the fastening strips at one or more corner portions of the decking panel.

14. The bed skirt of claim 10, wherein one or more of the fastening strips on the decking panel is discontinuous along the bottom edge and/or the side edges or the fastening strip of the skirt panel is discontinuous along the top edge of the skirt panel.

15. The bed skirt of claim 10, wherein the fastening strips on the decking panel and the fastening strip of the skirt panel define cooperating hook and loop fasteners.

16. A method for assembling an adjustable height bed skirt to cover a gap defined between a mattress of a bed and a floor surface upon which the bed sits, the method comprising:

positioning a discrete decking panel in a horizontal orientation between the mattress and a mattress support of the bed so that a top surface of the decking panel faces towards the mattress, the decking panel including a top edge, a bottom edge, and side edges extending between the top and bottom edges, with bottom corner portions defined at junctions between the bottom edge and the side edges, the decking panel further including a plurality of discrete, spaced-apart fastening strips on the top surface and extending along each of the bottom edge and side edges but not extending over the bottom corner portions; and engaging a skirt panel via a fastening strip of the skirt panel to one of the fastening strips on the bottom edge and side edges of the decking panel for extending the skirt panel along three sides of the bed, the skirt panel being repositionable to different ones of the fastening strips on the decking panel to adjust a vertical drop height that the skirt panel covers between the top of the mattress support and a bottom edge of the skirt panel, thereby adjusting for different heights of the bed.

17. The method of claim 16, further comprising:

prior to engaging the skirt panel via the fastening strip of the skirt panel to one of the fastening strips, identifying which of the plurality of fastening strips the skirt panel should be connected to provide the vertical drop height of a certain desired size via height adjustment indicia elements associated with and/or connected to each of the plurality of fastening strips and that identify which of the plurality of fastening strips the skirt panel should be connected to provide the vertical drop height of a certain desired size.

18. The method of claim 16, wherein engaging the skirt panel via the fastening strip of the skirt panel to one of the fastening strips of the decking panel comprises engaging the skirt panel via a fastening strip of the skirt panel to one of the fastening strips via hook and loop coupling.

19. The method of claim 16, wherein the skirt panel includes a top edge opposite the bottom edge and corner pleats that are positioned adjacent the bottom corner portions of the decking panel when the fastening strip of the skirt panel is engaged with one of the fastening strips of the decking panel, the fastening strip of the skirt panel extending along the top edge of the skirt panel except at the corner pleats.

20. The method of claim 16, wherein the plurality of fastening strips on the decking panel includes exactly three sets of fastening strips spaced apart from one another and extending along each of the bottom edge and side edges but not extending over the bottom corner portions.

* * * * *